United States Patent
Brew et al.

(10) Patent No.: US 9,632,859 B2
(45) Date of Patent: Apr. 25, 2017

(54) GENERATING PROBLEM SIGNATURES FROM SNAPSHOTS OF TIME SERIES DATA

(71) Applicant: International Business Machines Corporation, Armonk, NY (US)

(72) Inventors: Anthony T. Brew, Dublin (IE); Donagh S. Horgan, Cork (IE); Louise K. Nestor, Cork (IE); Vinh Tuan Thai, Cork (IE)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 14/736,514

(22) Filed: Jun. 11, 2015

(65) Prior Publication Data

US 2016/0364279 A1    Dec. 15, 2016

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC .......... *G06F 11/079* (2013.01); *G06F 11/076* (2013.01); *G06F 11/0709* (2013.01); *G06F 11/3006* (2013.01); *G06F 11/3447* (2013.01); *G06F 11/3452* (2013.01); *G06F 11/3495* (2013.01)

(58) Field of Classification Search
USPC ....................................................... 714/47.1
See application file for complete search history.

(56) References Cited

U.S. PATENT DOCUMENTS

| | | | |
|---|---|---|---|
| 7,814,548 B2 | 10/2010 | Mukhopadhyay et al. |
| 7,836,356 B2 | 11/2010 | Haas et al. |
| 8,024,301 B2 | 9/2011 | Dias et al. |
| 8,396,890 B2 | 3/2013 | Lim |
| 8,621,624 B2 | 12/2013 | Jang et al. |
| 8,818,932 B2 | 8/2014 | Nolan et al. |

(Continued)

OTHER PUBLICATIONS

Kavulya et al.; "Failure Diagnosis of Complex Systems"; Springer; in "Resilience Assessment and Evaluation of Computing Systems"; Chapter 12; pp. 239-261; © Springer-Verlag Berlin Heidelberg, 2012; <http://rd.springer.com/chapter/10.1007%2F978-3-642-29032-9_12>.

(Continued)

*Primary Examiner* — Sarai Butler
(74) *Attorney, Agent, or Firm* — William H. Hartwell

(57) ABSTRACT

Software that generates statistical models of events impacting computer systems and uses those models to detect similar events in the future. The software performs the following operations: (i) receiving a snapshot of a first event impacting a computer system, where the snapshot includes a first set of values for a plurality of metrics occurring over a first time period corresponding to the first event; (ii) extracting a first set of feature vectors from the first set of values; (iii) generating a first statistical model representing the first event based, at least in part, on the extracted first set of feature vectors; and (iv) determining that a second event is similar to the first event by comparing the first statistical model to a second set of values for the plurality of metrics occurring over a second time period corresponding to the second event.

20 Claims, 7 Drawing Sheets

(56) References Cited

U.S. PATENT DOCUMENTS

| | | |
|---|---|---|
| 8,819,005 B2 | 8/2014 | Hooks |
| 2009/0193298 A1 | 7/2009 | Mukherjee |
| 2012/0054554 A1* | 3/2012 | Dagan ................. G06F 11/0712 714/39 |
| 2016/0062842 A1* | 3/2016 | Plisko ................. G06F 11/1451 714/19 |
| 2016/0134490 A1* | 5/2016 | Balasubramanyan H04L 41/5032 707/638 |

OTHER PUBLICATIONS

Lane et al.; "Temporal Sequence Learning and Data Reduction for Anomaly Detection"; ACM Transactions on Information and System Security; vol. 2, No. 3; Aug. 1999; © 1999 ACM; pp. 295-331.

Patterson-Hine et al.; "A Review of Diagnostic Techniques for ISHM Applications"; NASA; Captured on Feb. 18, 2015; 22 pages; <http://ti.arc.nasa.gov/m/pub-archive/1094h/1094%20%28APH%29.pdf>.

"A Guide to Fault Detection and Diagnosis"; Greg Stanley and Associates; Printed on: Jan. 17, 2015; Copyright 2010-2013, Greg Stanley; 6 pages; <http://gregstanleyandassociates.com/whitepapers/FaultDiagnosis/faultdiagnosis.htm>.

"Mixture model"; Wikipedia; Last modified: Dec. 21, 2014; Printed on: Feb. 26, 2015; pp. 1-12; <http://en.wikipedia.org/wiki/Mixture_model>.

"Principal component analysis"; Wikipedia; Last modified: Jan. 31, 2015; Printed on: Feb. 26, 2015; pp. 1-28; <http://en.wikipedia.org/wiki/Principal_component_analysis>.

"Vector quantization"; Wikipedia; Last modified: Feb. 10, 2015; Printed on: Feb. 26, 2015; pp. 1-7; <http://en.wikipedia.org/wiki/Vector_quantization>.

\* cited by examiner

GENERATING PROBLEM SIGNATURES FROM SNAPSHOTS OF TIME SERIES DATA

BACKGROUND

The present invention relates generally to the field of systems management, and more particularly to detecting and/or diagnosing problems in complex data processing systems.

Systems management is known. Generally speaking, systems management includes the administration and management of computer systems. Some examples of common systems management tasks include, but are not limited to: performance management, storage management, capacity monitoring, security management (including anti-virus and anti-malware management), hardware inventory, software inventory, software installation, network utilization, and user activity monitoring.

Performance monitoring (also sometimes referred to as "performance management") is a known system management task that generally involves monitoring systems to help predict, detect, and/or diagnose problems. One way by which performance monitoring sub-systems monitor systems is by observing various system metrics over a period of time (where the data points for these metrics over time are commonly referred to as "time series data").

SUMMARY

According to an aspect of the present invention, there is a method, computer program product and/or system that performs the following operations (not necessarily in the following order): (i) receiving a snapshot of a first event impacting a computer system, where the snapshot includes a first set of values for a plurality of metrics occurring over a first time period corresponding to the first event; (ii) extracting a first set of feature vectors from the first set of values for the plurality of metrics occurring over the first time period; (iii) generating a first statistical model representing the first event based, at least in part, on the extracted first set of feature vectors; and (iv) determining that a second event is similar to the first event by comparing the first statistical model to a second set of values for the plurality of metrics occurring over a second time period corresponding to the second event.

DETAILED DESCRIPTION

Figure 1:
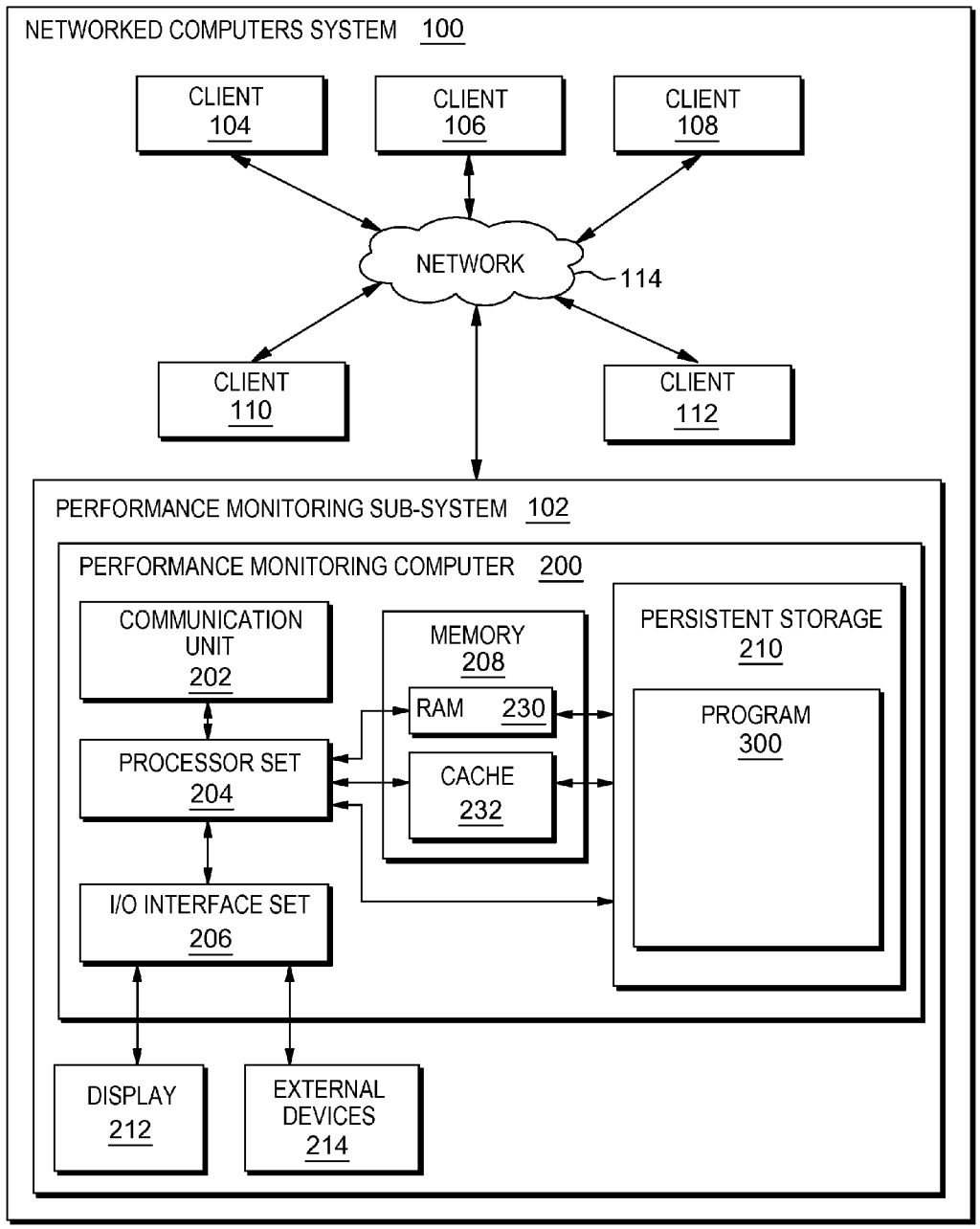
FIG. 1 is a block diagram view of a first embodiment of a system according to the present invention.

When an issue (or problem) occurs in a computer system, data (or metrics) relating to that specific occurrence of the issue can be vitally important in detecting related issues in the future. Embodiments of the present invention generate snapshots of time series data of metrics relating to particular issues and use those snapshots to create statistical models (or "signatures") that represent the conditions surrounding those issues. The signatures are then used to detect the occurrence of similar metrics in the future, thereby identifying likely reoccurrences of the original issues. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: performance monitoring sub-system 102; client sub-systems 104, 106, 108, 110, 112; communication network 114; performance monitoring computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with performance monitoring computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
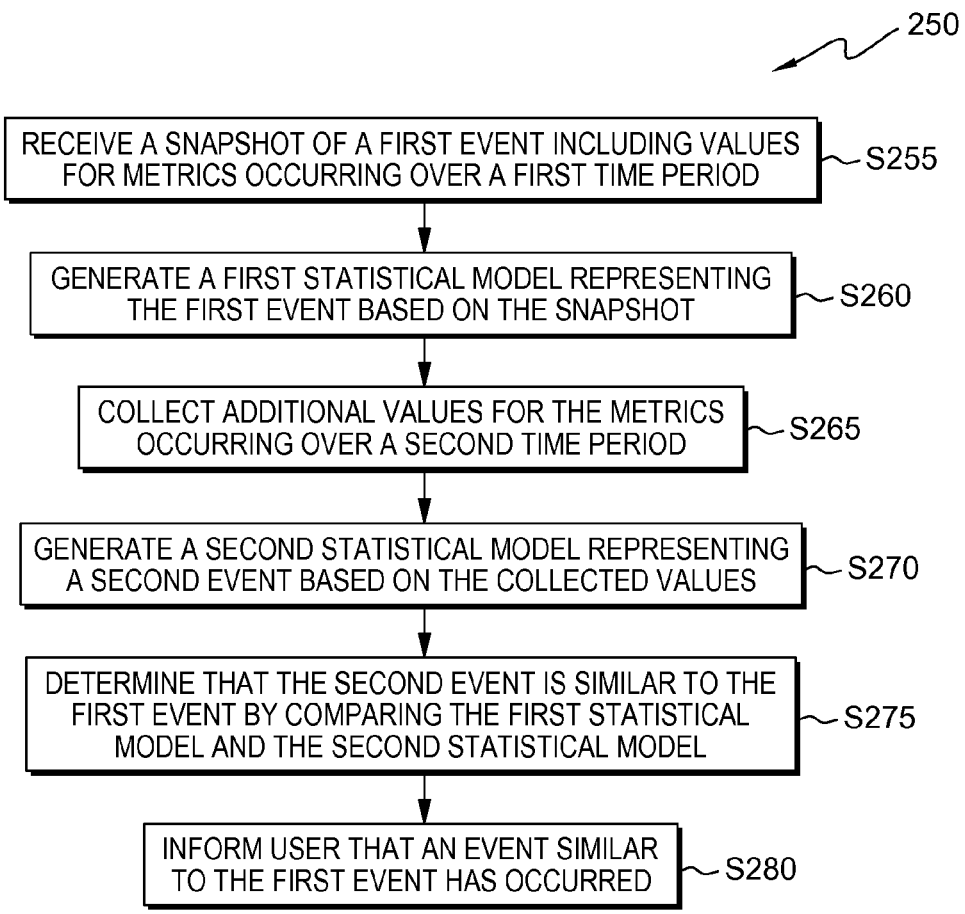
FIG. 2 is a flowchart showing a first embodiment method performed, at least in part, by the first embodiment system.
Figure 3:
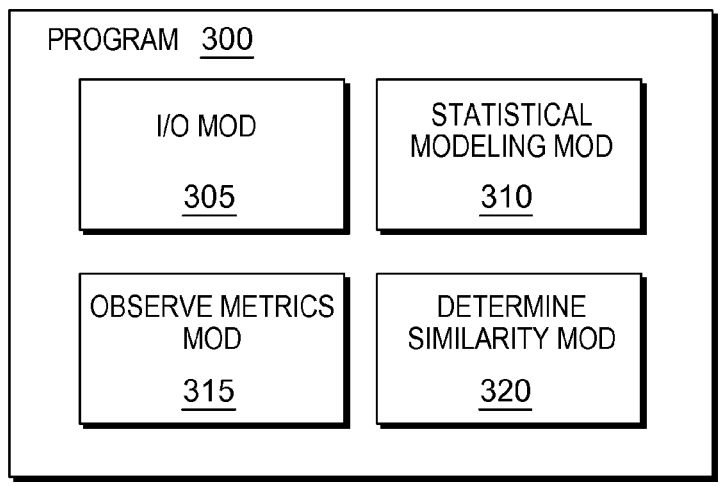
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

In the present embodiment, client sub-systems 104, 106, 108, 110, and 112 are devices that are capable of interacting with each other over network 114 utilizing wired and/or wireless communications. In this example, program 300 of performance monitoring sub-system 102 monitors wired and wireless communications metrics produced by these client sub-systems of computer system 100 in order to detect anomalous conditions (such as increased network latency). When anomalous conditions (or "events") are detected, program 300 generates a statistical model (or "signature") representing these conditions, and then uses that signature to detect the occurrence similar events in the future.

Processing begins at operation S255, where input/output ("I/O") module ("mod") 305 receives a snapshot of a first event impacting a computer system (for example, system 100). In this embodiment, the snapshot includes values (sometimes referred to as a "first set of values") for a plurality of metrics occurring over a time period (sometimes referred to as a "first time period") corresponding to the first event. Or, stated another way, the snapshot includes time series data for certain metrics that occurred (or were recorded) during the first event. In many embodiments, the metrics include metrics that are typically collected by performance monitoring systems (that is, hardware and/or software adapted to monitor the performance of computer systems). For example, the metrics may include, but are not limited to: (i) metrics related to computational resources used by various applications in the computer system (such as CPU usage, memory usage, hard disk space, network throughput, electrical power, and/or usage of various input/ output operations); and/or (ii) metrics related to the user experience of an end user (such as load times and/or response times). However, these are not meant to be limiting, and the metrics may include any information that is helpful in identifying the circumstances surrounding the occurrence of the first event.

In certain embodiments, the received snapshot has been "taken" (or "curated", "selected", and/or "chosen") by a human user. That is, in these embodiments, the plurality of metrics and the first time period are selected by a human user. In many cases, the human user is a person monitoring a computer system (using, for example, a performance monitoring system) who notices that strange or unusual activity is taking place. The user may "flag" this activity as a significant event (for example, the "first event") by taking a snapshot using the performance monitoring system software. In some cases, the user may be a subject matter expert with intricate knowledge of the inner-workings of the computer system. In other cases, for example, the user may be a systems administrator trained to identify when the metrics begin to deviate from a norm. Additionally, in alternate embodiments, the user might not, in fact, be a human, and may instead be an artificial intelligence entity with sufficient intelligence to act as a user (see the definition of "user" in the Definitions sub-section of this Detailed Description).

It should be recognized that although in many cases an event (such as the first event) represents a problem or an issue with the computer system, an event may be any of a wide variety of events that may impact a computer system, and is not necessarily limited to potentially negative and/or problematic events. Furthermore, although the snapshot includes values for metrics on the computer system, the event that the snapshot corresponds to does not necessarily need to be an event that actually occurs on the computer system (only one that impacts the computer system). Some examples of events that can impact a computer system include, but are not limited to: (i) events that have a potentially negative impact on the system, such as software errors and/or system performance errors; (ii) events that have a potentially positive impact on the system, such as the addition of new hardware and/or software or a reduction in the computer system's workload; (iii) events that have a neutral impact on the system, such as an email being received or the system clock being updated; (iv) events that are external to the computer system but still impact the computer system, such as a power outage or a new human user operating the computing system; and/or (v) any combination of the above.

Figure 4A:
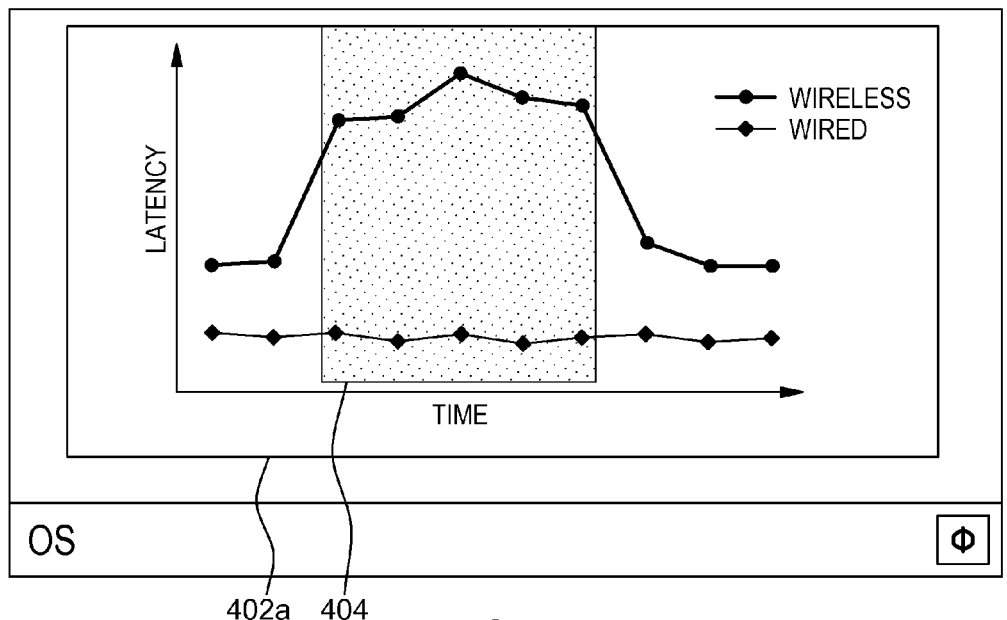
FIG. 4A is a screenshot view generated by the first embodiment system.

In the present example embodiment, the snapshot received in operation S255 is a snapshot that has been taken by a human user monitoring networked computers system 100 using performance monitoring sub-system 102. Specifically, the user has used performance monitoring sub-system 102 to view various metrics relating to the network performance of client sub-systems 104, 106, 108, 110, and 112. When reviewing the metrics, the user noticed an abnormal increase in wireless communications latency without a corresponding increase in the latency of wired communications. The user also observed that a thunderstorm was taking place outside of his office. As such, the user created a snapshot of the time series data corresponding to the time of the thunderstorm, which also happened to correspond to the time of the increased wireless latency. Screenshot 400a (see FIG. 4A) depicts an example of the user's computer screen at the time the snapshot was created. As shown in FIG. 4A, screen portion 402a of screenshot 400a includes a graph depicting two metrics over time: (i) wireless latency; and (ii) wired latency. Screenshot portion 404 indicates the portion selected by the user—which the user selected based on the observations mentioned above—to include in the snapshot. In this example, the snapshot includes: (i) metrics for wireless latency and wired latency; and (ii) a period of time pertaining to a first event, where the period is bounded by the left edge and the right edge of screenshot portion 404, and where the first event is the thunderstorm corresponding to that period.

Processing proceeds to operation S260, where statistical modeling mod 310 generates a first statistical model (also referred to as a "signature") representing the first event based, at least in part, on the snapshot. More specifically, in this embodiment, the first statistical model is based on feature vectors (sometimes referred to as a "first set of feature vectors") extracted from the first set of values. Many of the details for generating statistical models based on extracted feature vectors are discussed below (see the Further Comments and/or Embodiments sub-section of this Detailed Description), but, generally speaking, there are two sub-operations included in operation S260: (i) extracting feature vectors; and (ii) generating a statistical model based on the extracted vectors.

Regarding (i), above, the extraction of feature vectors may be performed using any of a wide variety of known (or yet to be known) feature extraction methods and/or techniques. In some embodiments, feature vectors are generated from the raw metric values (received as part of the snapshot in operation S255), and in other embodiments, feature vectors are generated from modified versions of the metric values (for example, normalized values and/or delta vectors). In still other embodiments, feature vectors are generated not from the metric values themselves, but from information based on the metrics. Generally speaking, the feature vectors may be any vectors capable of representing information related to the metrics (including the values for the metrics). The feature vectors may include as few as two dimensions, and as many dimensions as might be desired to effectively represent the information. For additional discussion of feature vectors and feature extraction, see the Further Comments and/or Embodiments sub-section of this Detailed Description. In the present example embodiment, a two-dimensional feature vector is extracted for each metric value included in the snapshot. As a result, five feature vectors are extracted for values of the "wireless" metric, and five feature vectors are extracted for values of the "wired" metric (see FIG. 4A, depicting five values for each metric within screenshot portion 404).

Regarding (ii), above, the generation of a statistical model based on the extracted feature vectors may be based on any of a wide variety of known (or yet to be known) methods for generating models for vectors, including, for example, principle component analysis and vector quantization. Further, although any known (or yet to be known) statistical models may be used, some examples include, but are not limited to: (i) Gaussian mixture models; (ii) hidden Markov models; and/or (iii) clustering based compression models. In alternate embodiments, the statistical model (that is, the signature) is a vector generated by combining the extracted feature vectors using known (or yet to be known) methods. For example, in the present example embodiment, the ten extracted vectors (see previous paragraph) are added together to generate a single vector that represents the entire dataset. For a detailed discussion of statistical model generation according to the present invention, see the Further Comments and/or Embodiments sub-section of this Detailed Description.

Processing proceeds to operation S265, where observe metrics mod 315 collects additional values (sometimes referred to as a "second set of values") for the plurality of metrics, where the additional values occur over a second time period (and where the second time period is different from the first time period). In this operation, program 300 is collecting additional metric values for the purposes of identifying an event similar to the first event (for example, an issue in the computer system similar to the issue represented by the first statistical model). As such, it should be noted that the metrics monitored in this operation should include the same metrics included in the original snapshot received in operation S255, where the primary difference between values collected in operation S265 and those received in operation S255 is that they represent two different time periods. In many embodiments, observe metrics mod 315 monitors the plurality of metrics over time and periodically (or continuously) collects data on those metrics for the purpose of comparing the collected data to the first statistical model.

Figure 4B:
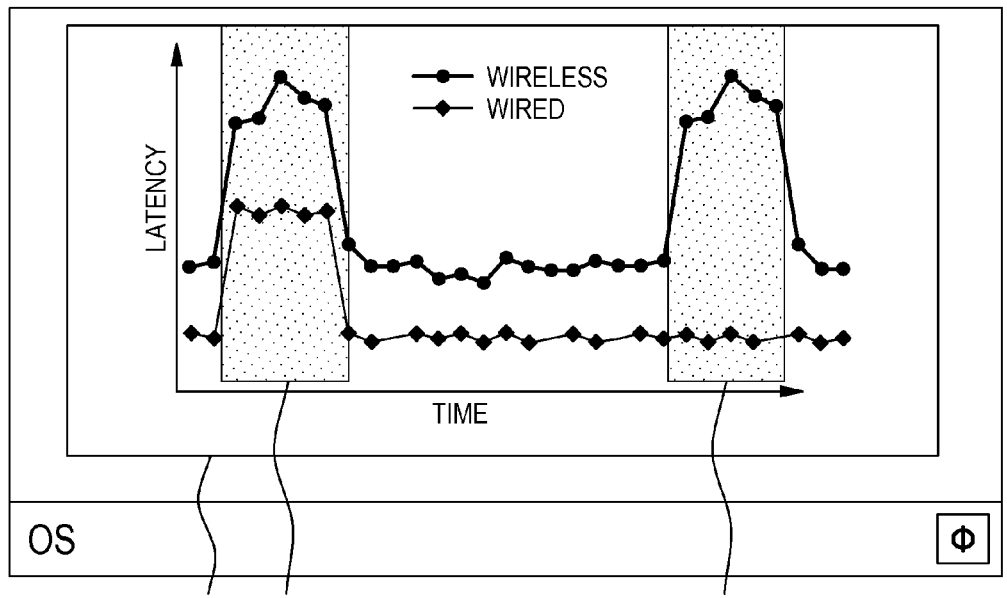
FIG. 4B is a screenshot view generated by the first embodiment system.

Screenshot 400b (see FIG. 4B) depicts an example of data that might appear on a computer screen during the collecting of operation S265. As shown in FIG. 4B, screen portion 402b includes a graph of data for the "wireless" and "wired" metrics over a period of time. In this embodiment, for example purposes, data is collected over two time periods: (i) a second time period corresponding to window 406; and (ii) a third time period corresponding to window 408. In this case, program 300 has determined that the time periods corresponding to windows 406 and 408 may potentially identify events related to the first event (the thunderstorm). As such, program 300 (and, more specifically, observe metrics mod 315) uses machine-logic based algorithms to collect the data corresponding to both of these time periods. It should be recognized that although the information contained in screenshot 400b is presented in screenshot form, this step does not require the observed metrics to be viewable on a computer screen. In fact, no user interaction is required in this operation, and in many embodiments the collection of data occurs automatically without any human intervention.

Processing proceeds to operation S270, where statistical modeling mod 310 generates a second statistical model representing a second event corresponding to the second time period, based, at least in part, on the collected additional values. In many embodiments, the second statistical model is generated using the same method used to generate the first statistical model in operation S260. More specifically, in these embodiments, the second statistical model is based on feature vectors (sometimes referred to as a "second set of feature vectors") extracted from the second set of values. For a discussion of ways by which a statistical model can be generated using feature vectors of collected metrics, see: (i) the discussion of operation S260, above; and (ii) the Further Comments and/or Embodiments sub-section of this detailed description.

In the present example embodiment, two statistical models are generated during operation S270: (i) a second statistical model corresponding to the second time period (where the second time period corresponds to a "second event"); and (ii) a third statistical model corresponding to the third time period (where the third time period corresponds to a "third event"). In this example, the second and third statistical models are generated in the same way as the first statistical model: vectors corresponding to each of their respective metric values are added together to create a single vector for each event.

Processing proceeds to operation S275, where determine similarity mod 320 determines that the second event is similar to the first event by comparing the first statistical model to the second statistical model. In certain embodiments, the two statistical models are compared using a distance metric. If the distance between the first statistical model and the second statistical model is below a predetermined threshold, then the first event and the second event are determined to be similar. Alternatively, if the distance between the first statistical model and the second statistical model are below a predetermined threshold, then the first event and the second event are determined to not be similar. A wide variety of known (or yet to be known) distance metrics for comparing statistical models may be used, including, for example, Kullback-Leibler distance. In other embodiments, however, non-distance-based methods may be used to compare the first statistical model and the second statistical model.

It should be recognized that although the present example embodiment determines that the second event is similar to the first event by comparing two statistical models, in other embodiments the similarity may be determined in other ways. For example, in some embodiments, the similarity between the second event and the first event is determined based on a comparison of the values for metrics corresponding to the second event (for example, the second set of values) and a statistical model generated from the metrics corresponding to the first event (for example, the first statistical model). That is, in these embodiments, the newly collected metrics are compared to a statistical model representing the first event in order to determine their similarity to the first event. In these embodiments, any known (or yet to be known) methods for comparing metric values to statistical models may be used. In still other embodiments, similarity is determined based on a direct comparison of values for metrics corresponding to the first event (for example, the first set of values) and values for metrics corresponding to the second event (for example, the second set of values). In these embodiments, many known (or yet to be known) methods for comparing metric values (or feature vectors extracted from those metric values) may be used, including, for example, distance metrics such as: (i) cosine distance; (ii) Euclidean distance; (iii) Manhattan (that is, city-block) distance; (iv) Pearson distance; (v) sum of absolute difference (SAD); (vi) sum of squared difference (SSD); (vii) mean-absolute error (MAE); (viii) mean-squared error (MSE); (ix) Chebyshev distance; (x) Minkowski distance; and/or (xi) Hamming distance.

In the present example embodiment, determine similarity mod 320 compares the first statistical model to the second statistical model and the third statistical model, respectively. However, in this example, only one of the models is found to be similar to the first statistical model. In this example, determine similarity mod 320 determines that the first statistical model is not, in fact, similar to the second statistical model corresponding to the second event. Specifically, referring to screenshot 400b, the metric values included in window 406 have a significant difference between the metric values included in the original screenshot. In the original screenshot (see screenshot portion 404 of screenshot 400a), the values for the wireless metric increased while the values for the wired metric stayed relatively level. But with window 406 of screenshot 400b, although the values for the wireless metric increased in a similar fashion to the original screenshot, the values for the wired metric increased as well. This difference indicates that the event corresponding to window 406 (that is, the second event) is not similar to the first event.

However, the event corresponding to window 408 (that is, the third event) does appear to be similar to the first event, as it includes the increase in values for the wireless metric without an increase in wired values. As such, determine similarity mod 320 determines that the third statistical model is similar to the first statistical model. Based on these two determinations, determine similarity mod determines that the third event is similar to the first event, but that the second event is not similar to the first event. While the third event may likely represent a thunderstorm or other inclement weather, the second event likely represents some other kind of event—such as, for example, an event that would impact network latency for both wired and wireless communications alike.

Figure 4C:
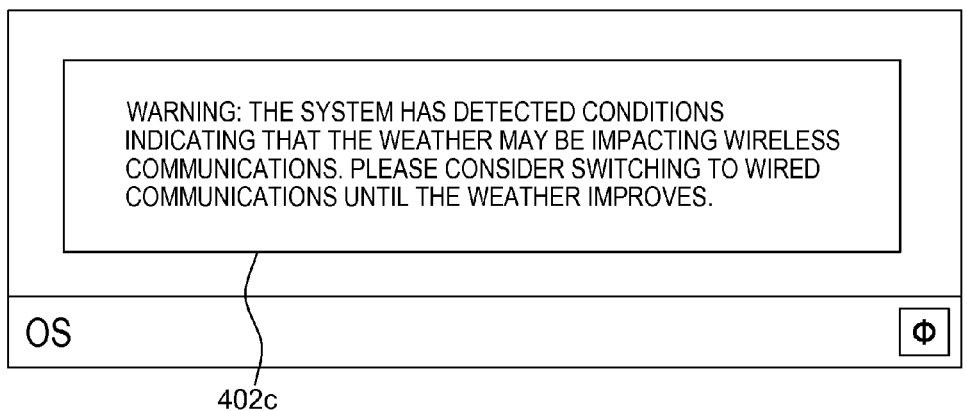
FIG. 4C is a screenshot view generated by the first embodiment system.

Processing proceeds to operation S280, where I/O mod 305 informs a user that an event similar to the first event has occurred. This informing may occur in any of a wide variety of known (or yet to be known) ways, including, for example, using display 212 and/or external device 214 of performance monitoring sub-system 102 (see FIG. 1). Screenshot 400c (see FIG. 4C) depicts an example of I/O mod 305 informing the user in the present example embodiment. Specifically, mod 305 outputs the following message for the user (as seen in screen portion 402c): "WARNING: the system has detected conditions indicating that the weather may be impacting wireless communications. Please consider switching to wired communications until the weather improves."

III. Further Comments And/or Embodiments

Some embodiments of the present invention recognize the following facts, potential problems and/or potential areas for improvement with respect to the current state of the art: (i) existing monitoring systems for predicting, detecting, and/or diagnosing problems involve significant manual encoding/rule writing; (ii) existing monitoring systems are only adapted to detect known anomalies/attacks on a network; (iii) existing monitoring systems tend to be error prone; (iv) it can take a large amount of effort to investigate and determine root causes based on information provided by a monitoring system in use; (v) in many cases, a subject matter expert might need to analyze data related to metrics involved in an incident over a time period; and (vi) existing systems that utilize snapshots capture snapshots of configurations instead of capturing snapshots of relevant time series data.

Some embodiments of the present invention may include one, or more, of the following features, characteristics and/or advantages: (i) creating a "snapshot" of metrics surrounding an issue; (ii) applying statistical learning methodologies to the snapshot; (iii) enabling similar issues to be automatically identified; (iv) utilizing previously performed diagnosis work to proactively identify reoccurrences of a problem in the future; (v) saving time at a signature creation level; (vi) saving time at a problem identification level; (vii) providing advance warning of upcoming issues; (viii) identifying new anomaly signatures in real time instead of relying on a preexisting signature database; (ix) comparing snapshots of relevant metric data with snapshots of background data to improve the accuracy of the relevant snapshots; and/or (x) saving money for users/maintainers of monitoring systems.

In certain embodiments, a monitoring system takes as input a selection of metric data curated for a system that gathers and displays metrics (or analytics). Users then diagnose an issue from the metrics, curating a selection of metrics that present visual proof of the issue. This curated selection of metrics is then used to model the issue for better detection of similar issues in the future.

Figure 5A:
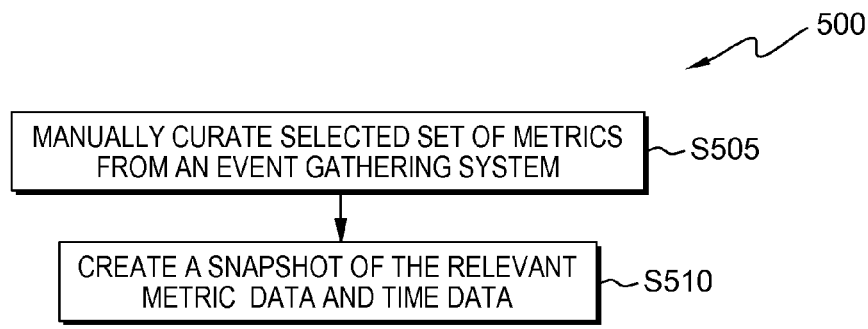
FIG. 5A is a flowchart showing a second embodiment method performed, at least in part, by a second embodiment system according to the present invention.
Figure 5B:
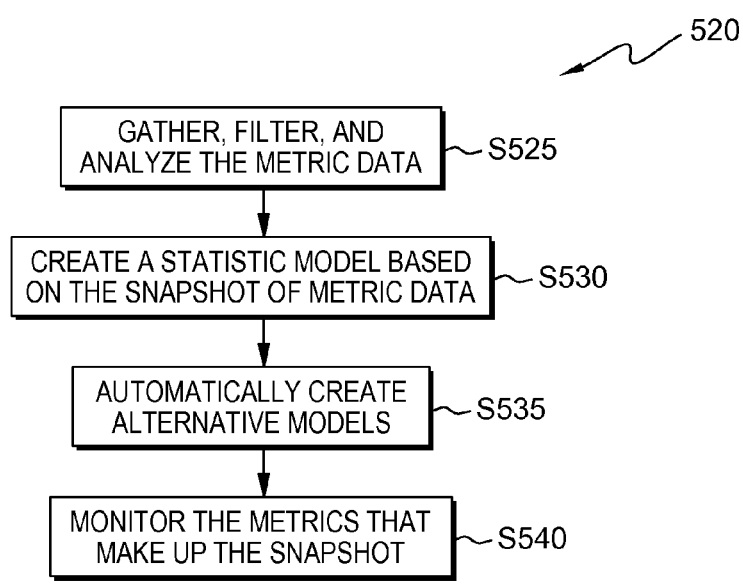
FIG. 5B is a flowchart showing a third embodiment method performed, at least in part, by the second embodiment system.
Figure 5C:
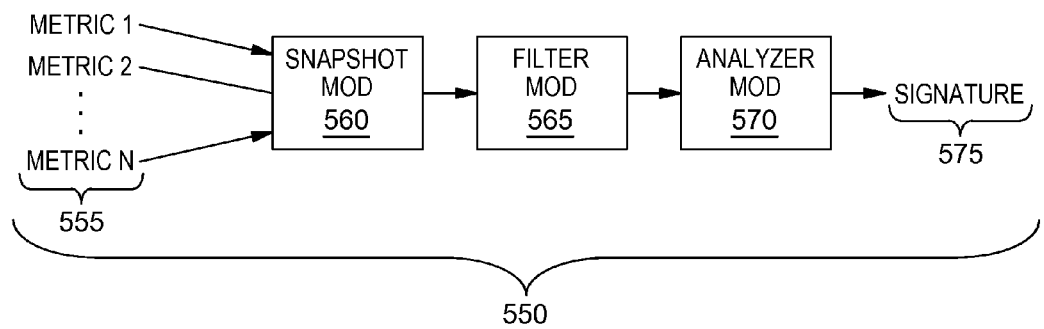
FIG. 5C is a diagram depicting components of the second embodiment system.

FIGS. 5A, 5B, and 5C depict a second embodiment system for generating problem signatures according to the present invention. FIGS. 5A and 5B show flowcharts depicting methods according to the second embodiment system, and FIG. 5C shows a diagram depicting components of the second embodiment system.

Referring first to FIG. 5A, flowchart 500 depicts a method to be performed by a user of a performance monitoring system, where the user is working to diagnose a problem using the data from the performance monitoring system. In the present example, the user is a human user. However, this is not meant to be limiting, and the user may be any user capable of performing the method operations depicted in flowchart 500 (for a definition of "user", see the Definitions sub-section of this Detailed Description).

Processing begins at operation S505, where the user (also referred to as an "operator") manually curates a selected set of metrics (for example, metrics 555, see FIG. 5C) from an event gathering system and visualizes the metrics for a given time range to build an understanding of the problem. Once the metrics are selected from the event gathering system, they are extracted, transformed, and loaded into the performance monitoring system so they can be analyzed by the user in near real time. The user then creates visualizations of the metrics to help diagnose the problem.

Processing proceeds to operation S510, where the user creates a snapshot of the relevant metric data and time data using snapshot mod 560 (see FIG. 5C). In this step, the user (who, in many cases, is a subject matter expert) analyzes the one or more metrics, using a front end user interface to select the metrics that are relevant to the problem and relevant periods of time that the metrics are to cover. This combination of time periods and metrics over time is referred to as a "snapshot." Because the snapshot is created by a user who may be a subject matter expert, the snapshot is considered to be a carefully analyzed description of one or more business-impacting problems.

Once the snapshot has been created, processing for this method ends, and manual interaction by the user ceases.

FIG. 5B shows flowchart 520 depicting a method for modeling problems for problem detection according to the second embodiment system. Generally speaking, this method is to be performed by one or more hardware and/or software modules according to the present invention. In the present example, the method is performed by the above-mentioned performance monitoring system.

Processing begins at operation S525, where the performance monitoring system (or, simply, the "system") gathers, filters, and analyzes the metric data from the snapshot (also referred to as the "snapshot data") created in step S510 of the previous method (see FIG. 5A). In the present example, the system filters the data using filter mod 565 and analyzes the data using analyzer 570. In some embodiments, the snapshot data is analyzed (for example, by analyzer 570) in its raw form. However, in other embodiments, it may be desired to reduce the amount of data being analyzed (for example, if the system is subject to time, computation, and/or power constraints). In these embodiments, filter mod 565 (see FIG. 5C) may use filtering techniques to reduce the dimensions of the original snapshot data while still maintaining the data's core characteristics. By using an inexpensive filter, the volume of raw data can be reduced at a relatively small cost to the overall accuracy of signature generation. Many known (or yet to be known) filtering methods may be used, including, but not limited to: (i) a moving average filter; (ii) a Kalman filter; (iii) a Wiener filter; (iv) a high pass filter; (v) a low pass filter; (vi) a band pass filter; and/or (vii) no filter (which effectively forwards the raw data to the analyzer component).

Figure 6:
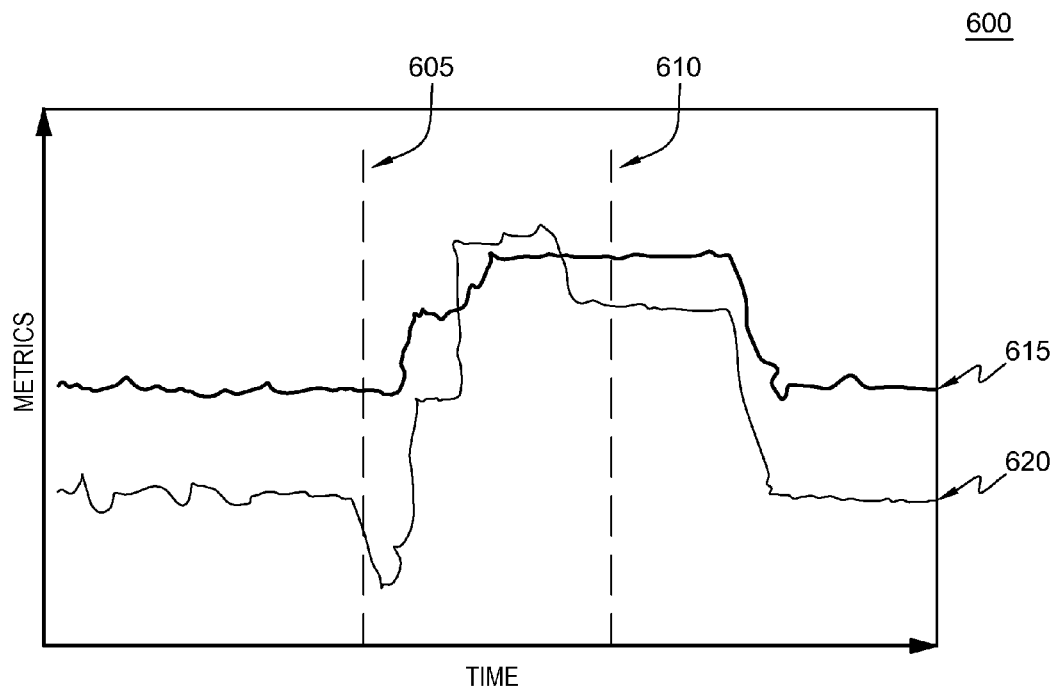
FIG. 6 is a graph showing time series data that is helpful in understanding the second embodiment system.

Processing proceeds to operation S530, where the system (or, more specifically, analyzer 570) creates a statistical model (also referred to as a "signature") based on the snapshot of metric data. First, time series data from the metrics involved in the snapshot are retrieved from the performance monitoring system's data store. Graph 600 (see FIG. 6) depicts an example of the time series data. More specifically, the horizontal axis in graph 600 represents time, and the vertical axis in graph 600 represents the metrics. The area between time 605 and time 610 represents the snapshot, and metric 615 and metric 620 represent metric data.

In some embodiments (discussed in further detail, below), alternative statistical models may be created using data outside of the snapshot area (that is, data before time 605 and/or after time 610).

Once the time series data has been retrieved, a number of feature vectors are extracted from that data, where feature vectors are representations of the data in a continuous vector space. In some embodiments (including the second embodiment system currently being discussed), the extraction includes: (i) normalizing the data (for example, mean centering); and (ii) creating a feature vector for each time interval of the snapshot. In some embodiments, the feature vector includes the raw values of the metrics for the particular period of time included in the snapshot (or the normalized version of those values). In other embodiments, the feature vector includes a delta vector of those raw values of the metrics for the particular period of time included in the snapshot and raw values for immediately surrounding periods of time (thereby encoding temporal information—sometimes referred to as temporal transition information—into the feature vector). In still other embodiments, the feature vector includes double deltas (where a double delta is a delta vector of two or more delta vectors).

Once the feature vectors have been extracted (a process that is sometimes also referred to as "feature extraction"), the snapshot is encoded as a collection of feature vectors. A model representing the encoded snapshot may then be created using one of a number of known (or yet to be known) methods. Some examples of methods that may be used to create models of snapshots include, but are not limited to: (i) principle component analysis; (ii) vector component analysis; and/or (iii) a Gaussian mixture model.

In certain embodiments, the methods used to create models of snapshots are similar to those used in an area known as speaker verification. In these embodiments, the primary differentiators between known speaker extraction methods and methods of the present invention are: (i) the present invention is focused on a sample subsection of a time-series as opposed to an entire signal; and (ii) the present invention encodes multiple signal sources together as opposed to a source from a single speaker. Furthermore, with methods of the present invention: (i) temporal information is encoded; (ii) parameters for each snapshot are not manually specified; and (iii) descriptive statistical signatures are automatically built (for use in automatically recognizing similar patterns in the future).

Processing proceeds to operation S535, where alternative models are automatically created by sampling the same input metrics (for example, metric 615 and metric 620) used in the snapshot outside of the range of interest. For example, referring again to FIG. 6, alternative models may be created from the area before time 605 or the area after time 610. The alternative models are then compared to the signature (also referred to as the "target model") to determine whether the same issue occurring in the target model is occurring elsewhere (that is, in the alternative models).

In some embodiments, a measure of the difference between the target model and the alternative models can be obtained by comparing the models using a distance metric (see the Example Embodiment subsection of this Detailed Description). In other embodiments, however, other metrics and/or methods for comparing alternative models to the target model may be used.

In some embodiments, alternative models are created by re-sampling the input metrics (for example, metric 615 and metric 620) and generating new feature vectors from those metrics. The alternative models can then be used to determine whether a given set of metric values is similar or different from the metrics values included in the initial snapshot. In one embodiment, for example, each model (both the target model and each of the alternative models) generates an expectation score indicating a level of agreement that a set of feature vectors could have come from the model in question. In this embodiment, the score for the target model is called "score_in" and the score for the alternative model(s) are called "score_out".

Processing proceeds to operation S540, where the system (using, for example, a signature matching engine) monitors the metrics that make up the snapshot to determine whether metric values similar to those included in the snapshot are occurring. In some embodiments, the system extracts feature vectors for the monitored metrics and passes the extracted feature vectors to analyzer 570 to generate a statistical model (or signature). If the newly generated model compares favorably to a known target model, the user is proactively made aware that a known problem is reoccurring.

In some embodiments, a score is used to determine whether metric values similar to those included in the snapshot are occurring. For example, in one embodiment, a similarity score is calculated by subtracting the value of "score_out" (discussed above) from the value of "score_in" (discussed above). In this embodiment, a high score could indicate, for example, that the metric values are a good match for the target model, and a low score could indicate that they are not a good match. In another embodiment, a distance function such as Euclidean distance is used to compare the metric values to the target model, producing a score indicating a level of "fit" for the metric values to the snapshot represented by the target value.

Figure 7:
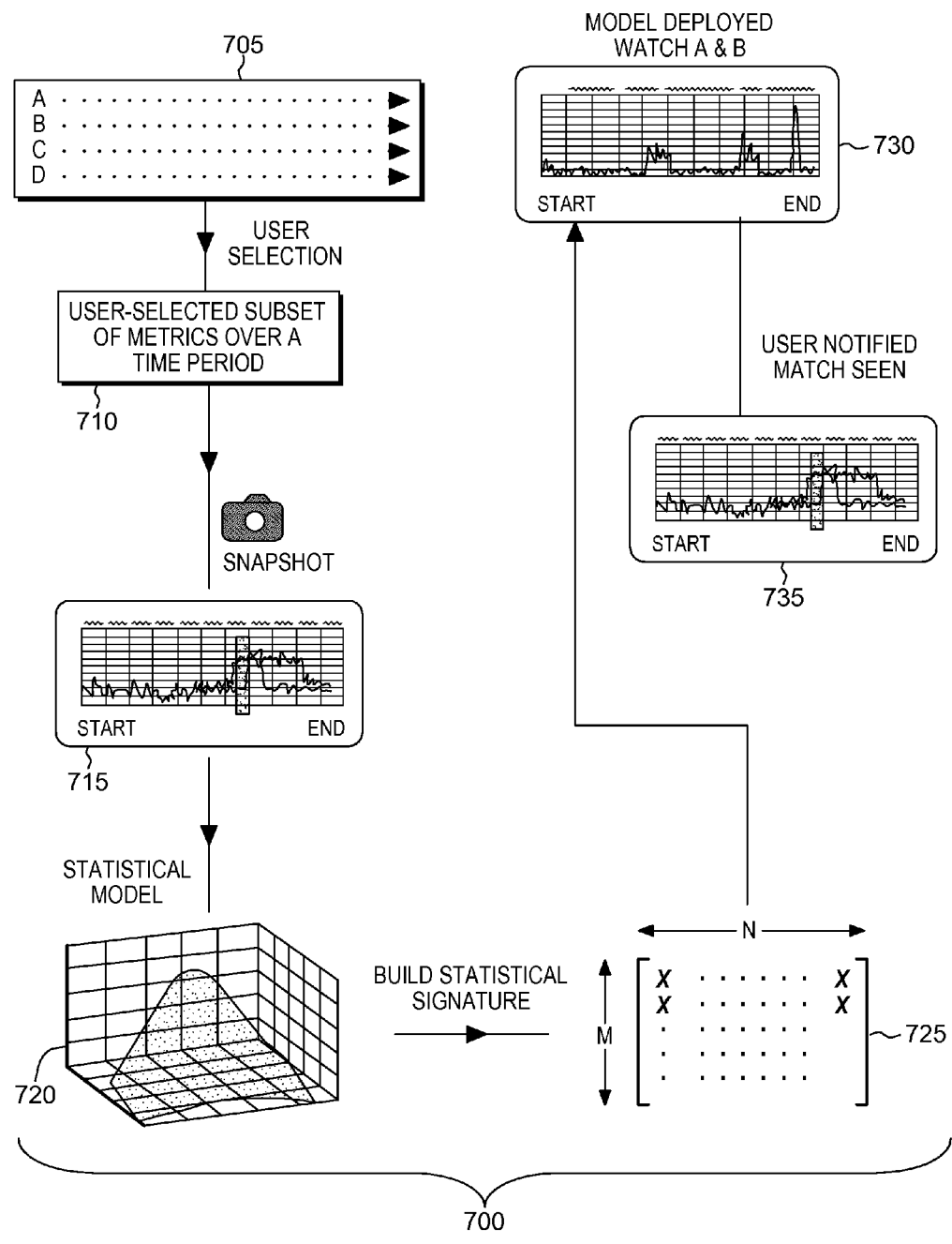
FIG. 7 is a diagram showing information that is helpful in understanding problem detection according to the second embodiment system.

FIG. 7 is a diagram (that is, diagram 700) showing information that is helpful in understanding problem detection according to the second embodiment system. More specifically, diagram 700 shows some of the operations of flowcharts 500 and 520 being performed on actual data. As shown in FIG. 7, the performance monitoring system monitors four metrics 705: metric A, metric B, metric C, and metric D. A user selects (S505) two of these metrics (metric A and metric B) to create a subset 710 of metrics, where the metrics include values over a given time period. Snapshot 715 is then created (S510), where snapshot 715 is based on the user-selected metrics (metric A and metric B). Statistical model 720 is created (S530) from snapshot 715, resulting in statistical signature 725 (where statistical model 720 and statistical signature 725 represent two different ways of representing the same information.) Statistical model 720 is then deployed, and future values of metric A and metric B (see time series data 730) are monitored (S540). When a match is found (that is, when future values of metric A and metric B generate a similar statistical model to statistical model 720), the user is notified of a match (depicted as match 735).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    receiving, by one or more processors, a snapshot of a first event impacting a computer system, where the snapshot includes a first set of values for a plurality of metrics occurring over a first time period corresponding to the first event;
    extracting, by one or more processors, a first set of feature vectors from the first set of values for the plurality of metrics occurring over the first time period;
    generating, by one or more processors, a first statistical model representing the first event based, at least in part, on the extracted first set of feature vectors; and
    determining, by one or more processors, that a second event is similar to the first event by comparing the first statistical model to a second set of values for the plurality of metrics occurring over a second time period corresponding to the second event.

2. The method of claim 1, wherein the plurality of metrics and the first time period for the snapshot are selected by a human user.

3. The method of claim 1, further comprising:
    generating, by one or more processors, a second statistical model representing the second event based, at least in part, on the second set of values;
    wherein determining that the second event is similar to the first event by comparing the first statistical model to the second set of values includes comparing the first statistical model to the second statistical model.

4. The method of claim 3, wherein comparing the first statistical model to the second statistical model includes calculating a Kullback-Leibler distance.

5. The method of claim 1, wherein determining that the second event is similar to the first event by comparing the first statistical model to the second set of values comprises:
    generating, by one or more processors, a similarity score for the second set of values, wherein the similarity score represents an amount of likelihood that the second set of values could result from the first statistical model;
    determining, by one or more processors, that the similarity score for the second set of values is above a predetermined threshold; and
    responsive to determining that the similarity score for the second set of values is above the predetermined threshold, determining, by one or more processors, that the second event is similar to the first event.

6. The method of claim 1, wherein the comparing of the first statistical model to the second set of values utilizes a distance metric.

7. The method claim 1, further comprising:
    informing a user, by one or more processors, that an event similar to the first event has occurred.

8. A computer program product comprising a computer readable storage medium, wherein the computer readable storage medium is not a transitory signal per se, the computer readable storage medium having stored thereon:
    first program instructions programmed to receive a snapshot of a first event impacting a computer system, where the snapshot includes a first set of values for a plurality of metrics occurring over a first time period corresponding to the first event;
    second program instructions programmed to extract a first set of feature vectors from the first set of values for the plurality of metrics occurring over the first time period;
    third program instructions programmed to generate a first statistical model representing the first event based, at least in part, on the extracted first set of feature vectors; and
    fourth program instructions programmed to determine that a second event is similar to the first event by comparing the first statistical model to a second set of values for the plurality of metrics occurring over a second time period corresponding to the second event.

9. The computer program product of claim 8, wherein the plurality of metrics and the first time period for the snapshot are selected by a human user.

10. The computer program product of claim 8, further comprising:
    fifth program instructions programmed to generate a second statistical model representing the second event based, at least in part, on the second set of values;
    wherein determining that the second event is similar to the first event by comparing the first statistical model to the second set of values includes comparing the first statistical model to the second statistical model.

11. The computer program product of claim 10, wherein comparing the first statistical model to the second statistical model includes calculating a Kullback-Leibler distance.

12. The computer program product of claim 8, wherein determining that the second event is similar to the first event by comparing the first statistical model to the second set of values comprises:
   generating, by one or more processors, a similarity score for the second set of values, wherein the similarity score represents an amount of likelihood that the second set of values could result from the first statistical model;
   determining, by one or more processors, that the similarity score for the second set of values is above a predetermined threshold; and
   responsive to determining that the similarity score for the second set of values is above the predetermined threshold, determining, by one or more processors, that the second event is similar to the first event.

13. The computer program product of claim 8, wherein the comparing of the first statistical model to the second set of values utilizes a distance metric.

14. The computer program product of claim 8, further comprising:
   fifth program instructions programmed to inform a user that an event similar to the first event has occurred.

15. A computer system comprising:
   a processor(s) set; and
   a computer readable storage medium;
   wherein:
   the processor set is structured, located, connected and/or programmed to run program instructions stored on the computer readable storage medium; and
   the program instructions include:
      first program instructions programmed to receive a snapshot of a first event impacting a computer system, where the snapshot includes a first set of values for a plurality of metrics occurring over a first time period corresponding to the first event;
      second program instructions programmed to extract a first set of feature vectors from the first set of values for the plurality of metrics occurring over the first time period;
      third program instructions programmed to generate a first statistical model representing the first event based, at least in part, on the extracted first set of feature vectors; and
      fourth program instructions programmed to determine that a second event is similar to the first event by comparing the first statistical model to a second set of values for the plurality of metrics occurring over a second time period corresponding to the second event.

16. The computer system of claim 15, wherein the plurality of metrics and the first time period for the snapshot are selected by a human user.

17. The computer system of claim 15, wherein the program instructions further include:
   fifth program instructions programmed to generate a second statistical model representing the second event based, at least in part, on the second set of values;
   wherein determining that the second event is similar to the first event by comparing the first statistical model to the second set of values includes comparing the first statistical model to the second statistical model.

18. The computer system of claim 17, wherein comparing the first statistical model to the second statistical model includes calculating a Kullback-Leibler distance.

19. The computer system of claim 15, wherein determining that the second event is similar to the first event by comparing the first statistical model to the second set of values comprises:
   generating, by one or more processors, a similarity score for the second set of values, wherein the similarity score represents an amount of likelihood that the second set of values could result from the first statistical model;
   determining, by one or more processors, that the similarity score for the second set of values is above a predetermined threshold; and
   responsive to determining that the similarity score for the second set of values is above the predetermined threshold, determining, by one or more processors, that the second event is similar to the first event.

20. The computer system of claim 15, wherein the program instructions further include:
   fifth program instructions programmed to inform a user that an event similar to the first event has occurred.

* * * * *